T. COOPER.
ROLLER BEARING.
APPLICATION FILED JULY 22, 1910.

1,059,839.

Patented Apr. 22, 1913.

UNITED STATES PATENT OFFICE.

THOMAS COOPER, OF KING'S LYNN, ENGLAND.

ROLLER-BEARING.

1,059,839.

Specification of Letters Patent.   Patented Apr. 22, 1913.

Application filed July 22, 1910.   Serial No. 573,230.

*To all whom it may concern:*

Be it known that I, THOMAS COOPER, a subject of the King of Great Britain, and resident of Steel Works, King's Lynn, in the county of Norfolk, England, have invented new and useful Improvements in Roller-Bearings, of which the following is a specification.

To insure the durability of roller or ball bearings it is necessary that the surfaces in contact with the rollers or balls should be exceedingly hard.

In cases where shafts, axles or the like cannot be conveniently hardened it is customary to employ separate rings or sleeves of hardened steel fitted on to the shaft so as to form a path or race for the rollers or balls.

In numerous cases it is convenient to employ solid rings but in the case of long shafts such as the usual line shafting in factories it is not practicable to do so and the rings or sleeves have to be divided if they are to be reasonably convenient of application.

The present invention has reference to hardened divided sleeves or rings of the above description and has for its object to improve the same and the method of securing them to the shaft.

According to my invention the sleeve is made of steel which in the process of manufacture is stratified and made up of two qualities so that while one side of a bar or plate heated or dipped in water or other liquid in the usual way becomes very hard, the other side remains unhardened and the sleeve in process of production can be machined in all parts except the roller path, after the latter has been hardened. The roller path is finished by grinding. This process supersedes the usual process of case hardening. The two parts of the sleeve are severed from a bar or length of steel of suitable section and are bent into a circular form of the diameter required. The pieces are preferably cut diagonally so as to avoid (when fitted together) the joint lines being directly across the sleeve and to lead the rollers which run in contact therewith smoothly over the joints.

For securing the sleeve to the shaft the said sleeve is provided near its two edges with circumferential grooves and into these grooves are sprung spring clips. These clips which lie in the grooves level with or slightly below the periphery of the sleeve are sprung into position from opposite sides of the shaft and are placed across the dividing line of the sleeve. Two pairs of clips will generally be required to secure each sleeve and the ends of each pair, to keep them in place, will extend slightly beyond the central line of the sleeve, so as to overlap, or the ends may be turned down and hooked into notches in the recesses if preferred.

Figure 1:
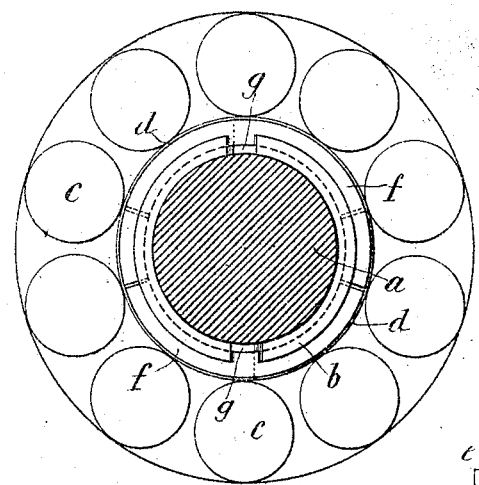
Figure 2:
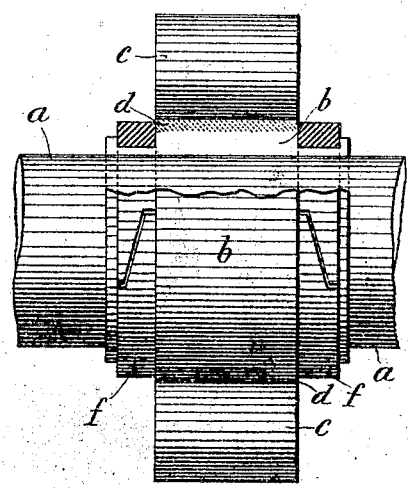
Figure 3:
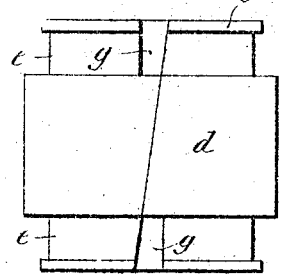
Figure 4:
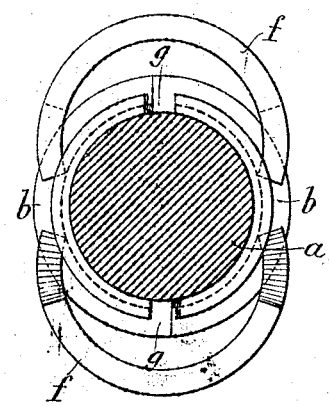

In the accompanying drawing Figure 1 is a cross section through a shaft fitted with a roller bearing embodying my improvements. Fig. 2 is an elevation partly in section. Fig. 3 shows the divided sleeve detached and Fig. 4 shows the sleeve in end view with a pair of spring clips about to be fitted thereto.

$a$ is the shaft.

$b$ is the sleeve divided diagonally as seen at Fig. 3.

$c$ are rollers adapted to run in contact with the hardened surface $d$ of the sleeve $b$. On either side of the surface $d$ near the ends of the sleeve $b$ are circumferential grooves $e$.

$f$ are spring clips to be used in pairs to lie in the grooves $e$ and retain the two halves of the sleeve $b$ firmly on the shaft $a$.

$g$ are notches in the sleeve $b$ to permit the end of the lever to be inserted and to enable the springs $f$ to be prized from their position.

A divided sleeve of stratified steel besides being durable is very easy to work and fit and the spring clips above described greatly facilitate its attachment. The spring clips enable the sleeve to be easily taken off and on in any position on the shafting. No bolts or rivets of any description are used in the attachment, which however is perfectly secure.

The method of securing sleeves to shafts is not confined to the hardened sleeves described but is equally applicable to those hardened by other means or not hardened at all.

Having now particularly described and ascertained the nature of the said invention and in what manner the same is to be performed, I declare that what I claim is:—

1. A roller bearing for shafting comprising a divided sleeve, rollers arranged to roll on the sleeve, and spring clips arranged in pairs to embrace the sleeve and retain it in position on the shaft, the peripheries of the spring clips being within the projected peripheral surface of the sleeve and the ends of the opposite members of a pair of spring clips being constructed to overlap when in locking position.

2. A roller bearing for shafting comprising a divided sleeve provided with a hardened annular bearing surface, rollers arranged to roll on the said hardened surface, and spring clips arranged in pairs with the members of a pair oppositely disposed to embrace the sleeve and retain it in position on the shaft, the peripheries of the spring clips being within the projected peripheral surface of the sleeve.

THOMAS COOPER.

Witnesses:
 ALFRED S. BISHOP,
 HERBERT D. JAMESON.